United States Patent
Okamoto (10) Patent No.: US 6,711,802 B2
(45) Date of Patent: Mar. 30, 2004

(54) METHOD OF MANUFACTURING MULTI-CORE FERRULE

(75) Inventor: Shinichi Okamoto, Saitama (JP)

(73) Assignee: Hikari Tech Co., Ltd., Tokyo (JP)

( * ) Notice: Subject to any disclaimer, the term of this patent is extended or adjusted under 35 U.S.C. 154(b) by 80 days.

(21) Appl. No.: 09/979,398

(22) PCT Filed: Jul. 10, 2001

(86) PCT No.: PCT/JP01/05983

§ 371 (c)(1),
(2), (4) Date: Nov. 19, 2001

(87) PCT Pub. No.: WO02/05001

PCT Pub. Date: Jan. 17, 2002

(65) Prior Publication Data

US 2003/0097745 A1 May 29, 2003

(30) Foreign Application Priority Data

Jul. 10, 2000 (JP) ........................................ 2000-246071
Feb. 8, 2001 (JP) ........................................ 2001-075065
Apr. 19, 2001 (JP) ........................................ 2001-159702

(51) Int. Cl.⁷ ........................... B23P 25/00; C03C 15/00
(52) U.S. Cl. ........................... 29/458; 29/596; 29/852; 29/609; 216/94
(58) Field of Search .................. 29/458, 852, 609, 29/596, 557, 738, 558; 216/94, 95, 41, 39, 12; 205/75, 76

(56) References Cited

U.S. PATENT DOCUMENTS 4,217,168 A * 8/1980 Ridgway et al. ............ 430/320
5,671,524 A * 9/1997 Damsky et al. ................ 29/596
5,707,749 A * 1/1998 Katagiri et al. ............ 428/73.5
5,918,359 A * 7/1999 Neuenschwander ........ 29/564.2
6,047,460 A * 4/2000 Nagate et al. ................ 29/598
6,240,636 B1 * 6/2001 Asai et al. .................... 29/852
6,406,988 B1 * 6/2002 Chung ........................ 438/612
6,532,651 B1 * 3/2003 Andou et al. ................ 29/852

FOREIGN PATENT DOCUMENTS

| JP | 54-134036 | 10/1979 |
|---|---|---|
| JP | 56-154232 | 11/1981 |
| JP | 63-312139 | 12/1988 |
| JP | 1-95039 | 4/1989 |
| JP | 3-46393 | 2/1991 |
| JP | 4-256510 | 9/1992 |
| JP | 5-341158 | 12/1993 |
| JP | 6-138344 | 5/1994 |
| JP | 8-304657 | 11/1996 |
| JP | 9-243863 | 9/1997 |
| JP | 9-277193 | 10/1997 |
| JP | 10-109228 | 4/1998 |
| JP | 10-268145 | 10/1998 |
| JP | 11-017091 | 1/1999 |

* cited by examiner

Primary Examiner—Peter Vo
Assistant Examiner—Stephen Kenny
(74) Attorney, Agent, or Firm—Richard M. Goldberg (57) ABSTRACT

A method of manufacturing a multi-core ferrule, in which method a plurality of flat-surface metal sheets 2 containing a plurality of apertures 1 of the same size are laminated and fixed together. The plurality of apertures 1 before subjected to lamination and fixing are designed to be in positions and to have diameters such that they communicate with one another to be capable of forming a cavity, whereby the resulting ferrule is highly accurate in diameter and positions of the pores and is applicable to multi-core connectors, devices and so on.

24 Claims, 7 Drawing Sheets

METHOD OF MANUFACTURING MULTI-CORE FERRULE

TECHNICAL FIELD

The invention relates to a method of manufacturing a multi-core ferrule, which is particularly strict in dimensional accuracy among ferrules, which are main components of connectors for use in connection of optical fibers or of devices.

BACKGROUND ART

There are demands for such types of multi-core ferrules for use in optical connectors, devices or the like that have cores or apertures of from about 2, 4, 6, 8, 10, 12 up to about 100 or more in desired positions.

However, practical multi-core ferrules now commercially available are no more than two-core type zirconia ferrules, and the actuality is that it is substantially impossible to manufacture those having more than two cores due to the difficulty in achieving extremely strict accuracy on the order of microns in terms of the bore diameter and the position of the apertures.

Figure 1:
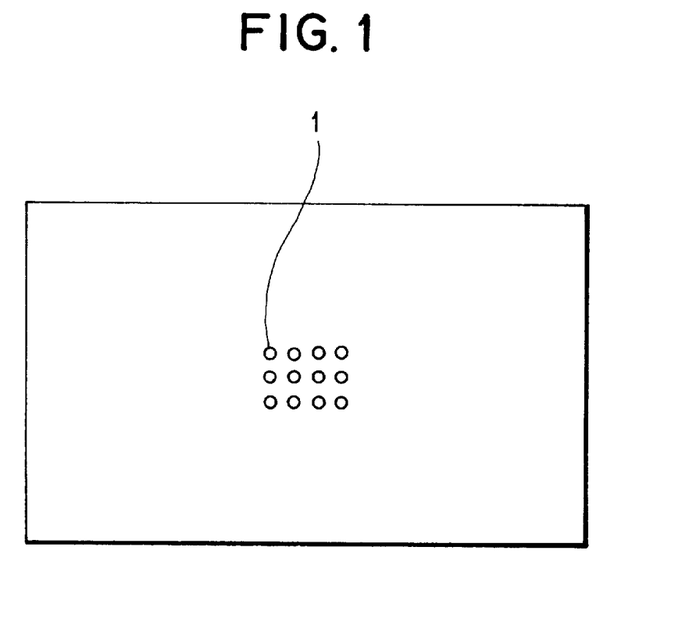
FIG. 1 is an enlarged plan view showing a multi-core ferrule according to one embodiment of the present invention.

To explain the above-mentioned actual situation, FIG. 1 is an enlarged plan view of a rectangular twelve-core type ferrule, and in fact there is in some cases a demand for designing a ferrule having a thickness of around 2.0 mm, in which apertures 1 having a diameter of around 0.126 mm are defined at a pitch of around 0.25 mm.

However, in spite of earnest research and development made by outfits concerned in an attempt to manufacture such ferrules by means of plastic moldings according to the design, trial products resulted from the development are poor in heat resistance and high in linear expansion factor, and there are troubles including bending of core pins, so that it is far from achieving dimensional accuracy on the order of microns in terms of the bore diameter and positions of the apertures essentially demanded.

In view of the above-mentioned actual situation in manufacturing premises, the invention is directed to providing a method of manufacturing a multi-core ferrule, manufacture of which has so far been substantially impossible, and which method can relatively easily solve the fundamental subjects including the demanded strict dimensional accuracy and heat resistance.

DISCLOSURE OF THE INVENTION

In order to attain the above-mentioned object, the present invention is comprised of a method of manufacturing a multi-core ferrule, in which method a plurality of flat-surface metal sheets formed with the same plurality of apertures are laminated on one another and fixed together, the improvement wherein the plurality of apertures are designed in positions and diameters such that the plurality of apertures formed in the respective metal sheets having not been laminated and fixed are in communication with one another to be capable of forming cavities.

BEST MODE FOR CARRYING OUT THE INVENTION

As described above, the present invention has as essential constituents:

a. to laminate a plurality of flat-surface metal sheets and to fix them together, and b. to allow the plurality of apertures defined in the metal sheets to communicate to one another to define a cavity.

In addition, the reason why a plurality of flat-surface metal sheets (referred below simply to as "metal sheet") are laminated and fixed together instead of using a single-layer metal sheet is that a metal sheet having a predetermined thickness or more cannot give sufficient accuracy in terms of the bore diameter and that it takes much time in processing to lead to high cost.

Embodiments based on the above items a and b will be explained below.

Flat-plate shaped metal sheets used in the present invention may be of any kind, so long as they have sufficient corrosiveness, heat resistance, toughness, water resistance, hardness and linear expansion.

While a metal sheet of, for example, titanium, stainless steel, copper alloy, ferro-alloy, aluminum alloy or the like can be applied to the present invention, titanium metal sheets, ferro-alloys called Invar and Kovar can be selected as particularly preferred embodiments by virtue of their particularly small coefficients of linear expansion.

Metal sheets having a thickness of around 0.1 to 1.0 mm can be used in most cases in the present invention.

And, the thinner the metal sheet is, the easier it becomes to achieve dimensional accuracy of apertures, but there occurs a problem due to insufficiency of strength and a need of many sheets for manufacture of a single ferrule uneconomically. On the other hand, the thicker the metal sheet is, the harder it becomes to achieve a dimensional accuracy in photo resist processing, punching, etc.

Taking account of these circumstances, it is necessary to select the thickness of metal sheets depending on the practical manufacture method. In formation of apertures, there is a tendency that a thickness of around 0.1 to 0.3 mm is suitable in the case of punching to be described later, and that in the case of the photo resist method capable of obtaining the highest accuracy, a thickness of 0.05 to 0.1 mm and a thickness of 0.1 to 0.5 mm are very suitable in the etching method and in the forming method, respectively.

Depending upon the intended purpose of the multi-core ferrule, however, there are some cases where the dimensional accuracy is not strict, and so there is no general restriction on the thickness of metal sheets.

That is, it is possible to suitably select such a thickness of metal sheets, as will increase accuracy, as necessary, of the positions of apertures and the bore diameter thereof depending on the manufacture method.

Referring to combinations of metal sheets in terms of thickness, it is of course possible to include not only lamination of metal sheets having the same thickness but also lamination of metal sheets having different thicknesses.

Use of a rather thick metal sheet or sheets for, for example, the uppermost and/or the lowermost layers can attain enhancement in strength, prevention of lifting caused by deformation from the flat-plate state, elimination of problems in V-counterbore processing.

In addition, while it is possible to employ metal sheets having the same or different planar configurations, it is in many cases convenient in handling if the sheets have the same planar configuration, when applied to products of practical use.

As will be described later in each example according to the present invention, there can be employed, as manners of manufacturing planar-shaped metal sheets having a plurality of apertures in desired positions, the photo resist processing, the photo resist forming, punching, drilling making use of NC machine tools, laser processing, electrical discharge machining, and combinations thereof. Among these, the photo resist processing, the photo resist forming and the electrical discharge machining can be adopted to manufacture products of highest accuracy.

The present invention will be explained below by way of examples.

EXAMPLE 1

Example 1 adopts a method resorting to the photo resist processing in formation of metal sheets having a plurality of apertures, in which the apertures are formed by etching.

The processing technique itself by the photo resist processing has been adopted in manufacture of integrated circuits as shown in, for example, Japanese Unexamined Patent Publication No. Hei 11-17091, and the use of such processing technique is known well.

Figure 2:
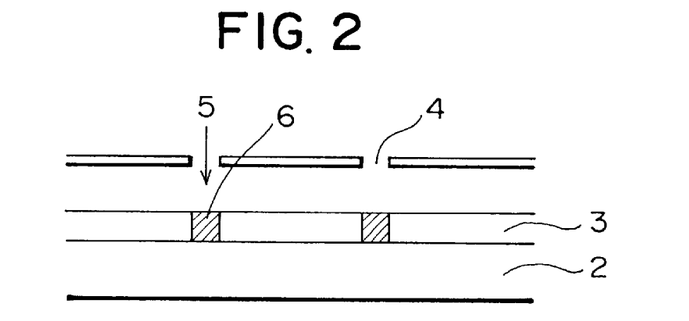
FIG. 2 is a schematic, enlarged cross sectional view, in an embodiment of manufacturing a multi-core ferrule by a photo resist processing according to the invention, showing a state where a photo resist film is formed on a metal sheet and is exposed to light rays through an exposure pattern mask.

In formation of apertures in a metal sheet according to the present invention, a photo resist film 3 is formed first on a metal sheet 2 by coating, printing or the like as shown in FIG. 2, and irradiating rays of light such as laser beams or the like through an exposure pattern mask 4 after the film 3 is dried to form exposed portions 6.

When photo resist portions are subjected to exposure, the photo resist undergoes a chemical change and can be developed by other chemical treatments.

While it is possible, for example, to leave unexposed portions in a soluble state and make the exposed portions non-soluble or non-reactive to a particular developer, the exposed portions can conversely be made soluble in a particular developer depending on the photo resist employed.

Figure 3:
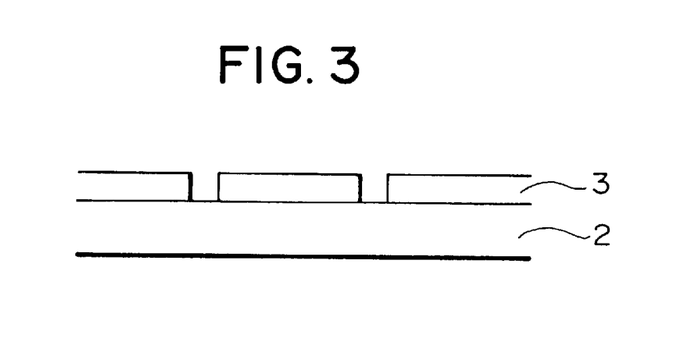
FIG. 3 is a schematic, enlarged cross sectional view in the embodiment of manufacturing a multi-core ferrule by the photo resist processing according to the invention, showing a state where exposed portions of the photo resist film are dissolved and removed.
Figure 4:
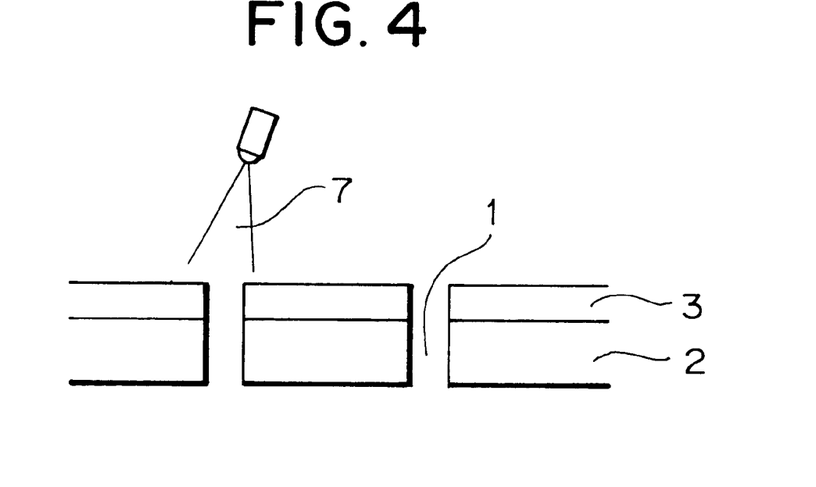
FIG. 4 is a schematic, enlarged cross sectional view, in manufacturing a multi-core ferrule by the photo resist processing according to the invention, showing a state where the metal sheet is bored by an etching liquid.

In the case of a positive-type photo resist, apertures 1 can be formed at intended sites by dissolving the exposed portions 6 of the photo resist film 3 using a particular solvent, removing the resulting exposed portions 6 by a blowing step to expose the metal sheet 2 as shown in FIG. 3, and then performing etching with an etchant 7 by the blowing step or the like as shown in FIG. 4.

In particular, in the case where, for example, titanium is used to make the metal sheet 2, apertures can be formed by using a dilute hydrogen fluoride solution as the etchant, and in the case where a copper alloy is used, apertures can be formed efficiently by using a dilute ferric chloride solution.

More specifically, it suffices to design a planar configuration as shown in FIG. 1 for a photo resist pattern and to precisely manufacture a metal sheet having the planar configuration shown in FIG. 1 and twelve apertures in the planar configuration. Besides, it is desirable in terms of economic rationality to adopt a method of manufacturing at one time several tens to several hundreds of metal sheets having, for example, twelve apertures in a cycle step using a large metal sheet, in consideration of the planar configurations of plural sheets instead of a single sheet.

In addition, in the case where a negative type photo resist is adopted, a similar metal sheet can be formed by reversing exposure pattern mask employed for the positive type photo resist.

EXAMPLE 2

Example 2 adopts the photo resist processing in formation of metal sheets having a plurality of apertures. This Example does not adopt formation of apertures by etching like Example 1 but adopts a so-called forming method to thereby perform formation of metal sheets and apertures at a time.

Figure 5:
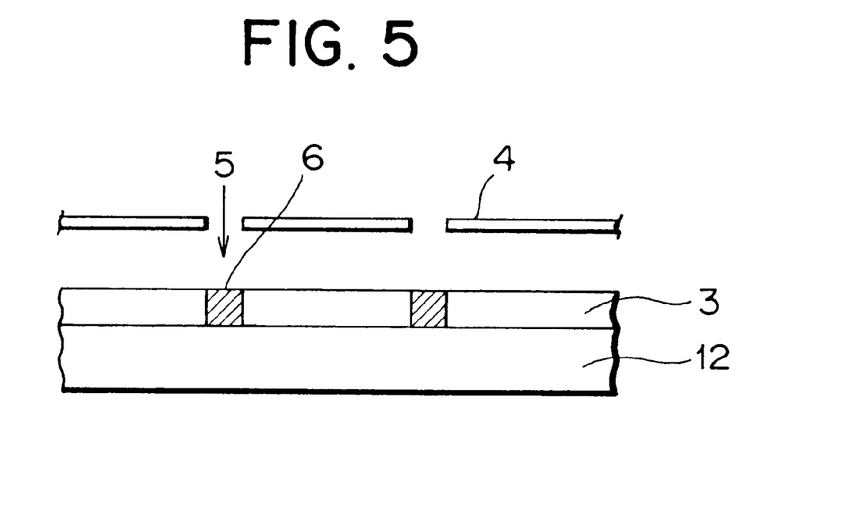
FIG. 5 is a schematic, enlarged cross sectional view in an embodiment of manufacturing a multi-core ferrule by a photo forming method in the photo resist processing according to the invention, showing a state where unexposed portions of the photo resist film are dissolved and removed.

While the metal sheet 2 is arranged, as shown in FIG. 2, below the photo resist film 3 in Example 1, a conductive substrate 12 is arranged, as shown in FIG. 5, in Example 2.

Figure 6:
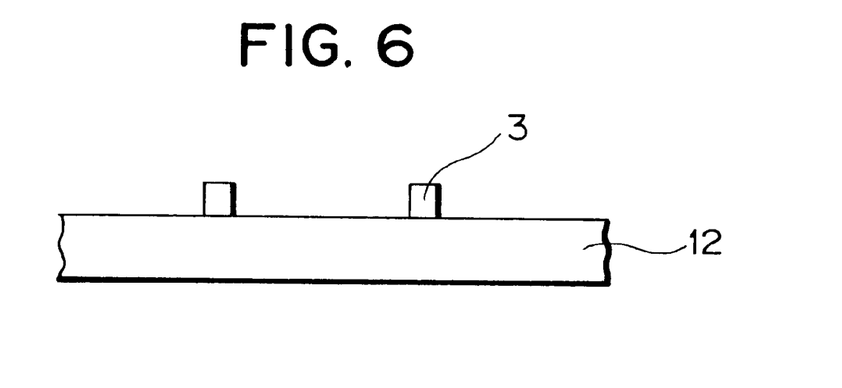
FIG. 6 is a schematic, enlarged cross sectional view, in manufacturing a multi-core ferrule by the photo forming method according to the invention, showing a state where a conductive substrate is exposed.

A positive type photo resist is adopted, exposed portions 6 in the photo resist film 3 are made insoluble, portions except the exposed portions 6 are made soluble to be dissolved by a particular solvent, and the portions except the exposed portions 6 are removed to expose the conductive substrate 12 as shown in FIG. 6, and then the mold release treatment is carried out.

Figure 7:
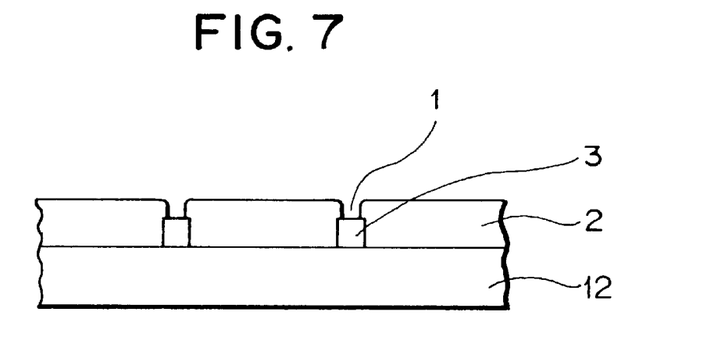
FIG. 7 is a schematic, enlarged cross sectional view showing a state, where a metal is deposited on the exposed substrate shown in FIG. 6 by way of electroforming.
Figure 8:
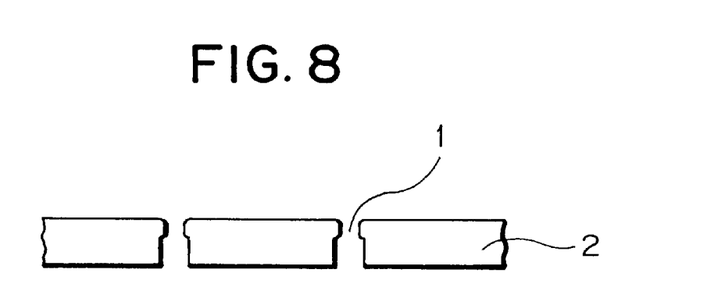
FIG. 8 is a schematic, enlarged cross sectional view, in manufacturing a multi-core ferrule by the photo forming method according to the invention, showing vicinities of apertures separated from the electroformed metal sheet.
Figure 9:
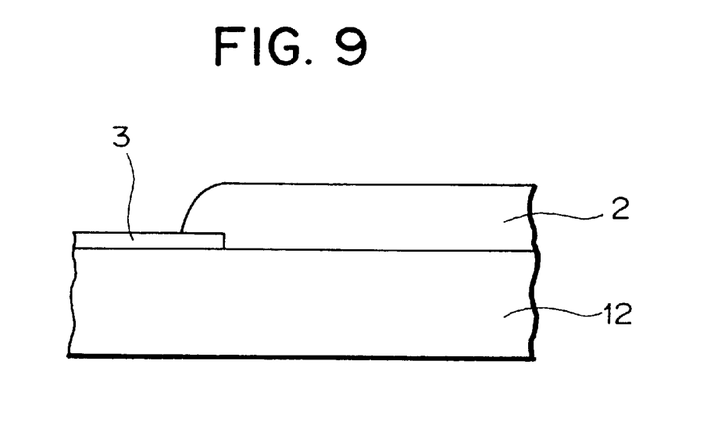
FIG. 9 is a schematic, enlarged cross sectional view showing a phenomenon that an electroforming metal is deposited to overlap the resist film, when the resist film according to the invention is thin.

Subsequently, electroforming is carried out with nickel, copper, iron, alloy thereof and the like to form a metal sheet 2 on the substrate 12 as shown in FIG. 7, and then the metal sheet 2 is peeled off to enable manufacture of a metal sheet 2 with a multiplicity of apertures 1 formed in positions corresponding to the exposed portions 6 as shown in FIG. 8.

In addition, in the case where a negative type photo resist is adopted, similar metal sheets can be manufactured by reversing exposure pattern mask employed for the positive type of photo resist.

There is generally a tendency that in the case where the resist film 3 is as thin as 1 $\mu$m to 10 $\mu$m, the thicker the metal sheet 2, the harder it is to achieve dimensional accuracy because an electroforming deposits in a manner to overlap the photo resist film as shown in FIG. 8.

And in extreme cases, there occurs a phenomenon that a part of the metal sheet under electroforming deposits on the photo resist film 3 to partly plug predetermined apertures to lower the dimensional accuracy of apertures.

Figure 10:
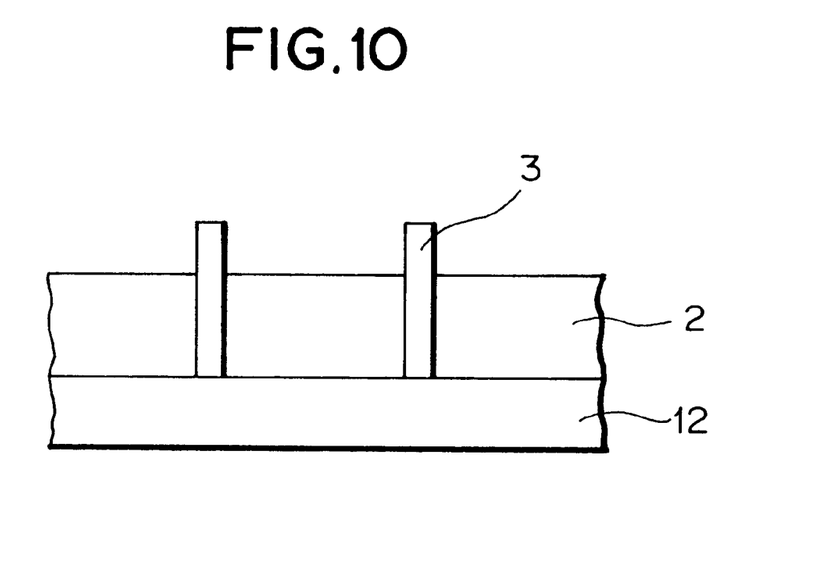
FIG. 10 is a schematic, enlarged cross sectional view showing a state, where an electroforming metal is deposited, when the resist film according to the invention is thick.

In the case where the photo resist film 3 is set to be extremely as thick as several tens of $\mu$m to several mm over the normal level, a multi-core ferrule having apertures of very high accuracy can be manufactured by forming a metal sheet 2 through the process of electroforming to a lower position than thin-rod mother dies of the photo resist film 3 as shown in FIG. 10.

For example, in the case where electroforming mother dies are manufactured by using an electron-beam curing resin, such as an X-ray curing resin as the photo resist film, irradiating an electron beam, such as X-ray through an X-ray pattern mask of heavy metal such as gold, platinum and lead to insolubilize the photo resist film at portions corresponding to apertures and dissolving and removing the remaining portions, it is possible to use an extremely thick resist film due to good permeability of electron beams, whereby a thicker metal sheet 2 can be electroformed. However, there is a limitation on the thickness of the metal sheet, since it takes much time for electroforming an excessively thick metal sheet and since the metal sheet is deformed by stresses.

That is, with the above-mentioned method, it becomes possible to manufacture a multi-core ferrule having apertures of very high accuracy.

Besides, the above-mentioned method has an advantage that influences of dust, which give rise to problems in the photo resist method, can be absolutely removed.

While the state of the raw material for electroforming in Example 2 differs depending upon the material of the metal sheet to be electroformed, it is possible to adopt an electroforming metal such as nickel or an alloy thereof, iron or an alloy thereof, copper or an alloy thereof, cobalt or an alloy thereof, tungsten or an alloy thereof, a fine particle dispersed metal or the like, and there is used an aqueous solution containing, as a main component, nickel sulfamate, nickel chloride, nickel sulfate, ferrous sulfamate, ferrous borofluoride, copper pyrophosphate, copper sulfate, copper borofluoride, cooper silicofluoride, titanium copper fluoride, copper alkanolsulfonate, cobalt sulfate, sodium tungstate or the like, or a liquid obtained by dispersing in these solutions fine particles of silicon carbide, tungsten carbide, boron carbide, zirconium oxide, silicon nitride, alumina, diamond or the like.

Among others, a bath based on nickel sulfamate is excellent in terms of ease of electroforming, diversity of physical properties such as hardness, chemical stability, ease of welding and the like.

Desirably, electroforming involving small stresses and hence a small deformation is carried out at a current density of around 1 to 10 $dm^2$ by performing high-speed filtration of the electroforming liquid through a filter having a filtration accuracy of about 0.1 to 5 $\mu$m, controlling the same in an appropriate temperature range of around $\pm 3°$ under warming and subjecting the same occasionally to active carbon treatment for removal of organic impurities; by supplying an electric current at a low current density of around 0.2 $A/dm^2$ across a corrugated plate of nickel plated iron serving as a positive electrode and carbon serving as a negative electrode to remove metallic impurities such as copper; and by adding a decreasing agent.

EXAMPLE 3

In Example 3, apertures are mechanically defined by punching work in a metal sheet formed already.

When a metal sheet is manufactured by such punching work, it is necessary to adopt a working method which provides high dimensional accuracy and is free from problems such as burr, whiskers, shear drop, deformation or the like on cut surfaces.

As described in, for example, Japanese Unexamined Patent Publication No. 2000-108077, it is desirable to adopt a method, characterized in that it uses a pair of opposing cutting-off blades (an upper blade and a lower blade) each having a cutting edge in the form of punching shape, and a punch fitted in the upper cutting-off blade and driven independent of the cutting-off blades to cut a workpiece between the upper and lower cutting-off blades by lowering the upper cutting-off blade and then to lower the punch and effect punching in the workpiece.

Taking account of production efficiency, it is desirable to manufacture several tens to several hundreds of metal sheets each having twelve apertures as shown in FIG. 1 at a time in a single operation.

EXAMPLE 4

In Example 4, processing with an NC machine tool is used to form apertures.

In the case of manufacture by such NC machine tool processing, machining by means of drilling of about 126 $\mu$m and wire cutting can be adopted. The drilling of about 126 $\mu$m can be implemented for a thickness of up to about 1.5 mm. Meanwhile, the method of forming apertures by drilling with NC machining, the method of cutting apertures with wire cutting, a method of forming small apertures of suitable size by means of laser processing or the like and by inserting a wire cutting wire through the small apertures to provide an aperture diameter and positions of apertures accurately by wire cutting, and the like can be freely adopted independently or in a combination.

EXAMPLE 5

Electric discharge machining is adopted to form a plurality of apertures.

Electric discharge machining is a process making use of the phenomenon of consumption of an electrode with electric discharge, and is suited to a very fine processing since it is a so-called non-contact processing carried out without direct contact with a workpiece.

And the principle of the processing is to oppose an electrode corresponding to a tool to a workpiece, and to process the workpiece by generating a pulsed discharge current of high cycles (several tens to several hundreds of thousands/sec) in a state where they are maintained at a predetermined distance from each other, to melt a metal or the like.

Specifically, a pulsed high voltage is first applied between the electrode in a processing liquid and the workpiece, and in this state spark discharge is generated between the electrodes.

Thereby, a column of electric discharge is formed, which shifts to a transient arc discharge to generate a temperature of 10,000° C. or higher to bring both the electrode and the workpiece into a molten state.

Such heat vaporizes not only the tool electrode and the workpiece but also the surrounding processing liquid such as various kinds of oils in a moment, and the pressure generated at this time blows off the molten substances to continue electric discharge machining in the non-contact condition.

Such a cycle is called a single-electric discharge, and this cycle is repeated several thousands to several tens of thousands times in a second to cause electric discharge continuously, while the tool electrode is supplied to the workpiece simultaneously to proceed processing of the workpiece.

The processing is realized by accumulation of traces of single-electric discharge, and it is necessary to implement electric discharge machining slowly by discharging rather small electric discharge energy per cycle small and taking time.

Further, since the processing interval varies depending upon conditions of processing, the kind of workpiece, and the like, it is necessary to determine conditions very deliberately including thickness of electrodes by carrying out a number of processing tests in order to enhance the dimensional accuracy.

Generally, electric discharge machines are roughly classified into four types.

More specifically, there are a profiling electric discharge machine (EDM) as a first type, which uses an electrode of a special configuration to project such configuration for processing; a thin hole-forming electric discharge machine as a second type for machining thin holes while rotating a thin electrode at a high speed; a wire electric discharge machine (W. EDM) as a third type for processing a two-dimensional profile in a jigsaw-like manner while winding a wire electrode; and an electric discharge machine as a fourth type for performing processing of micro holes and three-dimensional processing by forming a thin electrode having a diameter of several m $\mu$m using wire electric discharge grinding method and moving the thus formed electrode as desired.

Of these four types, the second, third and fourth electric discharge methods are appropriate in the invention.

In the method, which uses the thin hole-forming electric discharge machine of the second type for machining thin holes while rotating a thin electrode at a high speed, when a multi-core ferrule with, for example, twelve cores as shown in FIG. 1 is to be manufactured, a rectangular plate which is cut to a predetermined size and has a thickness of around 2 mm and a thin-rod shaped tungsten electrode determined in a test are provided. The rectangular plate is set on a stage of the electric discharge machine, and electric discharge machining is started after determination of a starting point deliberately using a microscope. Here, apertures of a predetermined size can be formed in predetermined positions by frequently replacing the consumable electrode with new ones for enhancement of dimensional accuracy and applying a predetermined high voltage while the electrode is rotated at a high speed of around 3,500 rpm using an NC machine.

There is a tendency that the smaller in thickness of the metal sheet, the higher the dimensional accuracy. While metal sheets having thicknesses of up to around 2 mm can be processed, the thickness of the metal sheet is limited to 0.3 to 0.5 mm in view of dimensional accuracy.

Figure 11:
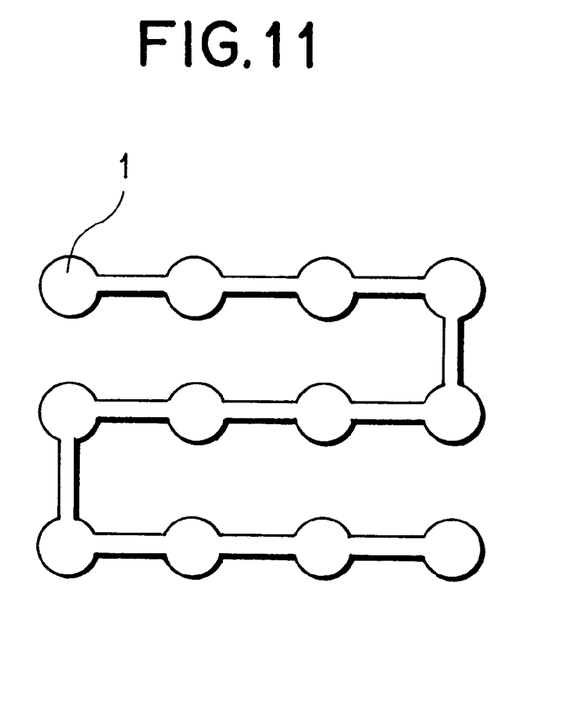
FIG. 11 is an enlarged plan view showing the case of manufacturing a multi-core ferrule by a wire electrical discharge machining method according to the invention, where apertures are connected to one another by way of communication grooves.

In the method, which uses a wire electric discharge machine (W. EDM) of the third type for processing a two-dimensional profile in a jigsaw-like manner while winding a wire electrode, there is provided a wire of tungsten or the like having a diameter of 0.03 to 0.08 mm and wound round a drum as an electrode, in addition to a plate provided in the same manner as described above. Small apertures are roughly formed, according to the method, using the above-mentioned thin hole-forming electric discharge machine or by irradiation of laser beams such that they permit insertion of the wire, at predetermined accurate positions. The wire is inserted to the small apertures one by one, and a stage is moved while the wire is wound to define apertures of the desired size. However, there occurs no inconvenience if the apertures 1 are connected to one another by communication slots 3. This method is desirable because if one aperture is formed at first, the other apertures can be formed automatically, saving the trouble in operation.

The method of the fourth type making, for performing machining of fine holes and three-dimensional processing by moving as desired a thin electrode having a diameter of several $\mu$m formed according to the wire electric discharge grinding method is carried out in the same manner as in the second method.

As the electrode, there is used a thin line made of copper, brass, tungsten, molybdenum or the like.

While any metal can be used in the invention, the metal preferably is excellent in physical and chemical properties including corrosiveness, heat resistance, toughness, water resistance, hardness and linear expansion. In particular, a ferro-nickel alloy called Invar and having the smallest coefficient of linear expansion of all the metals and a ferro-nickel-cobalt alloy called Kovar and used for glass-metal sealing in electric bulbs are highly suitable because of small variation in aperture positions attributed to the temperature.

Figure 12:
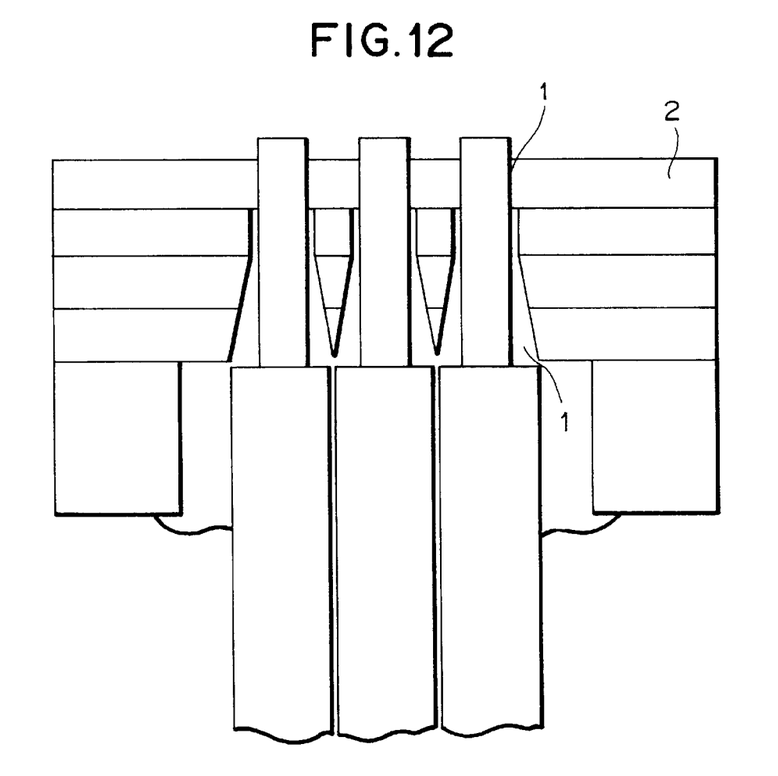
FIG. 12 is a schematic, enlarged side cross sectional view showing an embodiment according to the invention, where optical fibers are adhered.

In the case where metal sheets are subjected to boring with the electric discharge machining or the like and further to lamination, fixing and adhesion of optical fibers, if apertures are formed with high accuracy in the uppermost metal sheet of the laminate, as shown in FIG. 12, to realize close fixing of optical fibers, and forming roughly apertures, which are larger in the diameter than the essentially required size in terms of accuracy, in the other metal sheets constituting other portions of the laminate (other than the uppermost sheet). Employment of this method can attain improvement of workability and reduction in cost.

EXAMPLE 6

Example 6 relates to methods of various modes adopted in lamination and fixing of metal sheets.

Figure 13:
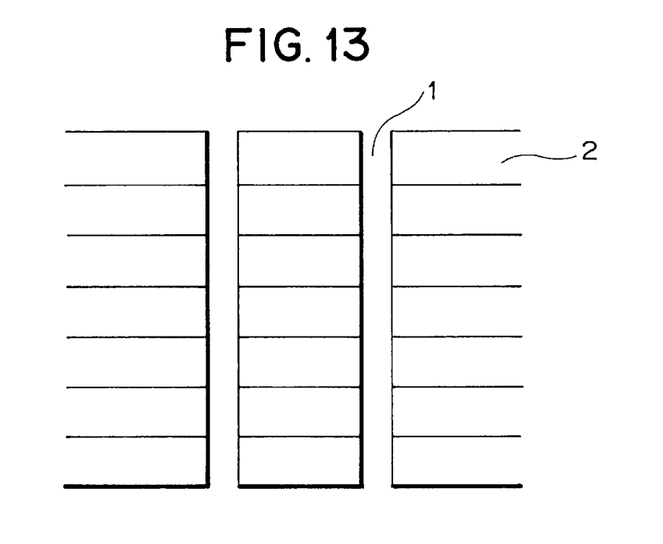
FIG. 13 is a schematic, enlarged cross sectional view of bored portions, showing an appearance in the case where metal sheets having apertures of a desired size formed therein according to the invention are stacked and fixed together.

Usually, metal sheets 2 cut to a predetermined size are accurately laminated and fixed together as shown in FIG. 13, and while the number of metal sheets to be laminated varies depending upon the thickness of the metal sheet 2, the metal sheets 2 are in any laminated slightly thicker than the target thickness.

Thus, if the laminate is designed to be slightly thicker than the target thickness, the laminate can be allowed to have accurate dimensions with respect to external shape and thickness by carrying out post polishing treatment.

The method of fixing the metal sheets 2 together can include a method utilizing spot welding, laser welding or the like, and a method utilizing soldering, an adhesive or the like. Generally, the method utilizing welding is desirable in view of performance, workability and the like.

Laser welding is most appropriate among the welding methods.

Figure 14:
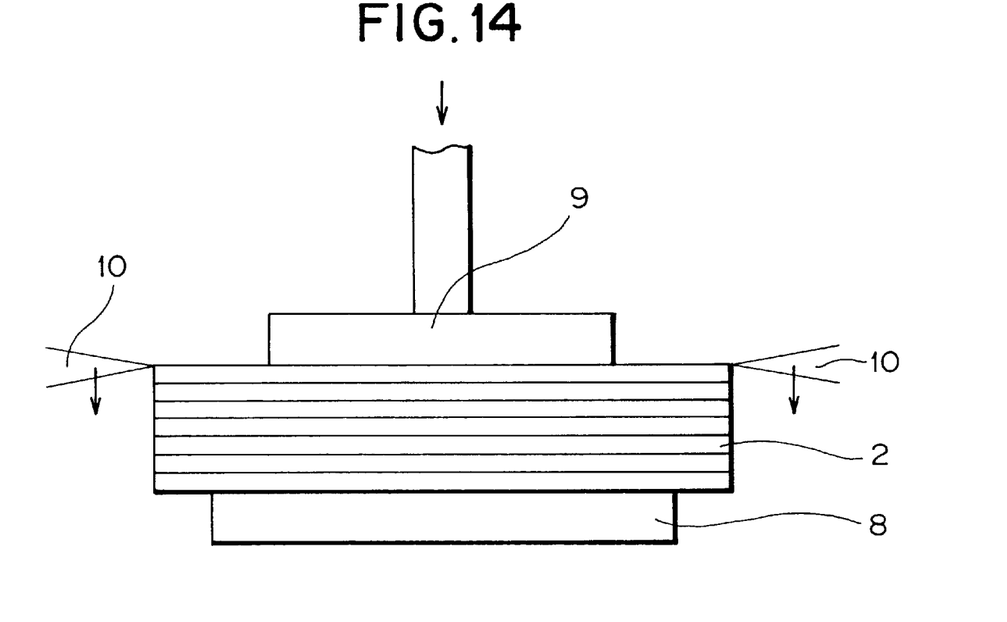
FIG. 14 is an enlarged cross sectional view showing a constitution in the case where metal sheets according to the invention are stacked and subjected laterally to laser welding.
Figure 15:
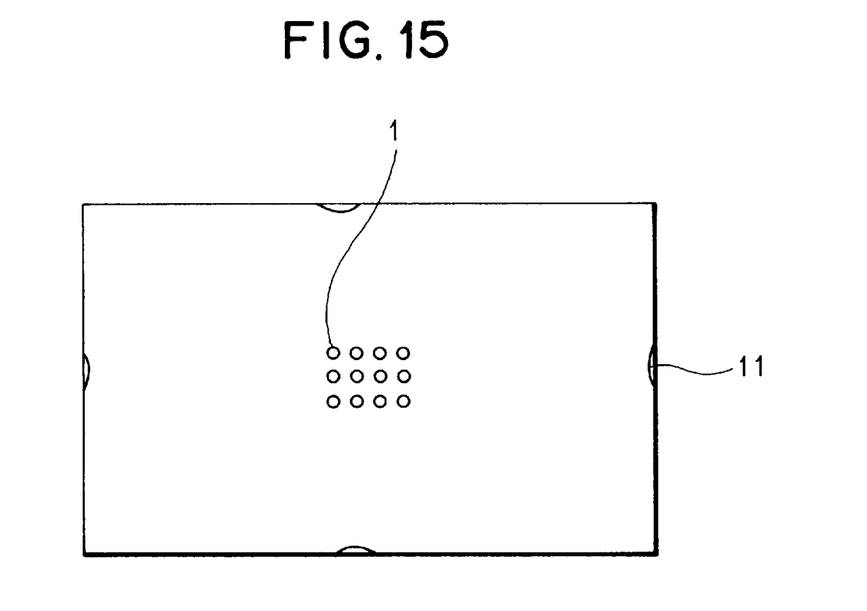
FIG. 15 is an enlarged plan view showing a state where metal sheets according to the invention are stacked and subjected laterally to laser welding.

Incidentally, when a pressing plate 9 presses downward metal sheets 2 aligned accurately on a base 8 as shown in FIG. 14, by pushing the sheets 2 laterally from both sides, and laser beams 10 are converted to points and are irradiated laterally at about 10 pulses/sec with an output of around 1.5 joule/point and at a speed of about 1 mm/sec simultaneously from the right and left sides, welds 11 shown in FIG. 15 are formed to a depth of around 0.3 mm, so that the metal sheets can be surely fixed to one another. Welding carried out at four or eight or more sites enables prevention of lifting of the metal sheets 2 and enhancement in strength.

In the case of spot welding (resistance welding), a high output enables welding of metal sheets having a thickness of up to 2 to 3 mm. However, an excessively high output may result in degradation of accuracy due to deformation caused by large strain. Therefore, it is desirable to perform spot welding on metal sheets having a thickness of 0.5 to 1.0 mm. There may be employed a method, in which the welded metal sheets are accurately stacked on one another and are subjected to the above-mentioned lateral laser welding.

Since lateral sides of a final product each assume a state where the metal sheets 2 are stacked and fixed together, a method may be adopted, in which the product is subjected to vapor-phase or liquid-phase plating on the lateral sides with the apertures 1 being covered, to integrate the laminate into one body and simultaneously to achieve adjustment of surface hardness such as by nitriding, for the purposes of preventing formation of metal particles caused by friction when the product is used as a connector and compensating for the strength of fixation.

Figure 16:
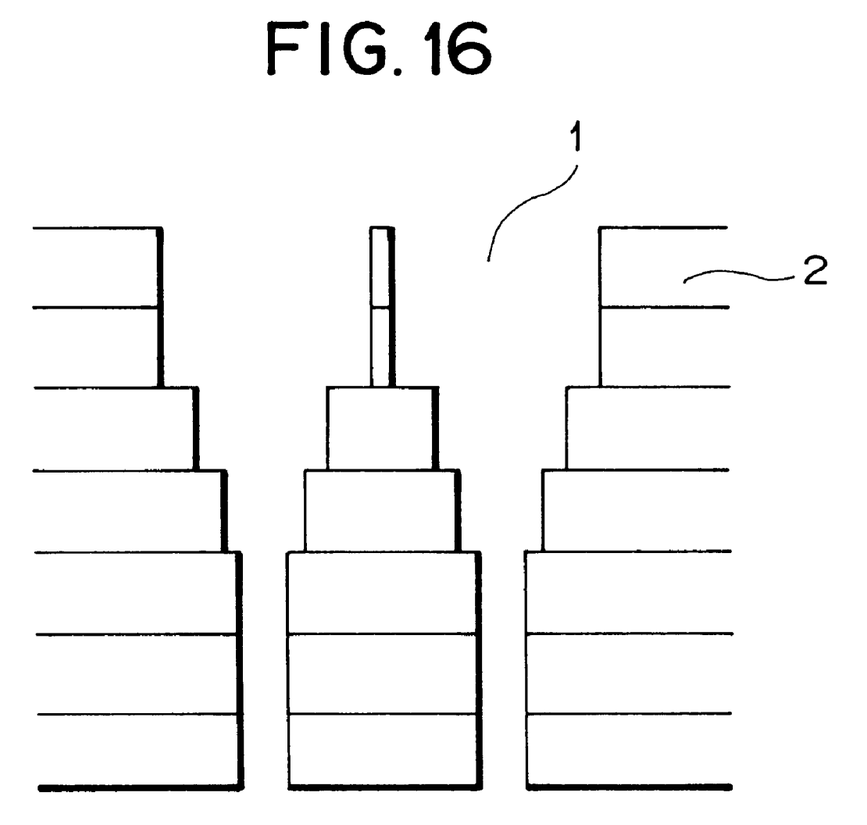
FIG. 16 is a schematic, enlarged cross sectional view, in the case where metal sheets having apertures of desired sizes formed therein according to the invention are stacked and fixed together showing a state, where metal sheets having apertures of different diameters formed therein are stacked in the ascending order in terms of the bore diameter.

The after-processing step of V-counterbore processing, which has been delicate and very troublesome, can be omitted by adopting a method, in which V-counterbores, which are needed upon insertion of optical fibers are formed by stacking metal sheets 2 and aligning them gradually from one having largest aperture to one having smallest diameter, for example, to be fixed together as shown in FIG. 16.

INDUSTRIAL APPLICABILITY

According to the method of the invention, substantial incapability of connection due to insufficiency in dimensional accuracy of ferrules used in multi-core connectors, devices or the like in the prior art is improved, connection is readily enabled, and performances such as heat resistance, linear expansion, hardness and weldability can be considerably improved by replacing the conventional resin molded products by metallic ones.

What is claimed is:

1. A method of manufacturing a multi-core ferrule, the method comprising the steps of;

providing a plurality of flat-surface metal sheets including at least one of a top sheet and a back side sheet, providing a plurality of apertures of the same number in each sheet, including the steps of:

forming apertures of high accuracy in diameter in the back side sheet, forming apertures of lower accuracy in diameter which are larger than a standard area of apertures in said back side sheet, in each other said sheet, arranging the apertures to have positions and diameters respectively such that the apertures in said sheets communicate with each other when placed in overlying relation so as to be capable of forming cavities, laminating said plurality of flat-surface metal sheets such that the apertures in each sheet overlie and communicate with each other, and fixing said plurality of flat-surface metal sheets together.

2. The method of manufacturing a multi-core ferrule according to claim 1, wherein centers of corresponding apertures in the plurality of metal sheets are located at the same positions respectively.

3. The method of manufacturing a multi-core ferrule according to claim 1, wherein the plurality of apertures in the respective metal sheets have centers at the some positions respectively, and further comprising the step of gradually laminating the metal sheets from one having apertures with a largest diameter to one having apertures with a smallest diameter.

4. The method of manufacturing a multi-core ferrule according to claim 1, wherein the metal sheets have the same size in a planar direction.

5. The method of manufacturing a multi-core ferrule according to claim 1, wherein the metal sheets have the same thickness.

6. The method of manufacturing a multi-core ferrule according to claim 1, wherein the metal sheets do not have the same thickness.

7. The method of manufacturing a multi-core ferrule according to claim 6, wherein a relatively thick one of the metal sheets is used as a back side layer.

8. The method of manufacturing a multi-core ferrule according to claim 1, wherein the plurality of apertures are formed in each metal sheet by the following steps:

laying the metal sheet under a photo resist, presetting positions and diameters of apertures on the photo resist by irradiation of light rays, and forming apertures in the metal sheet with the preset diameters in preset positions.

9. The method of manufacturing a multi-core ferrule according to claim 1, wherein the plurality of apertures are formed in each metal sheet by the following steps:

laying a conductive substrate under a photo resist film, irradiating light on the substrate to expose portions other than those where apertures of a predetermined diameter are to be formed in predetermined positions and expose the conductive substrate, formation of a metal sheet by means of electroforming, and separating the resulting metal sheet.

10. The method of manufacturing a multi-core ferrule according to claim 1, wherein the plurality of apertures are formed in each metal sheet by the step of punching a plurality of apertures in each metal sheet in preset positions and with preset diameters by cutting blades in a single punching operation.

11. The method of manufacturing a multi-core ferrule according to claim 1, wherein the plurality of apertures are formed in each metal sheet by one of the following steps:
   drilling, and
   wire cutting using an NC machine tool.

12. The method of manufacturing a multi-core ferrule according to claim 1, wherein the plurality of apertures are formed in each metal sheet by the following steps:
   boring beforehand the metal sheet by laser processing, and
   subsequently one of:
      drilling and
      wire cutting using an NC machine tool.

13. The method of manufacturing a multi-core ferrule according to claim 1, wherein the plurality of apertures are formed in each metal sheet by the step of electric discharge machining.

14. The method of manufacturing a multi-core ferrule according to claim 13, wherein the apertures are formed by means of wire electric discharge machining.

15. The method of manufacturing a multi-core ferrule according to claim 13, wherein the apertures are formed by means of thin hole-forming electric discharge machining, in which a thin hole is bored under rotation of a thin electrode at a high speed.

16. The method manufacturing a multi-core ferrule according to claim 13, wherein a thin electrode having a diameter as thin as several μm is formed by means of wire electric discharge grinding to achieve fine processing of the metal sheets by moving the electrode as desired.

17. The method of manufacturing a multi-core ferrule according to claim 13, further comprising the step of forming the apertures in a state such that the apertures are connected to one another by communicating slots.

18. The method of manufacturing a multi-core ferrule according to claim 13, wherein a material known under the trademark INVAR is used as a material of the metal sheets.

19. The method manufacturing a multi-core ferrule according to claim 13, wherein a material known under the trademark KOVAR is used as a material of the metal sheets.

20. The method of manufacturing a multi-core ferrule according to claim 1, wherein the step of fixing includes the step of adhesion in fixing together the plurality of metal sheets each containing a plurality of apertures in a laminated state.

21. The method of manufacturing a multi-core ferrule according to claim 20, wherein said, step of adhesion includes one of:
   soldering and
   an adhesive as a means of adhesion.

22. The method of manufacturing a multi-core ferrule according to claim 1, wherein the step of fixing includes the step of welding in fixing together the plurality of metal sheets each containing a plurality of apertures in a laminated state.

23. The method of manufacturing a multi-core ferrule according to claim 22, wherein said step of welding includes one of the following steps:
   lateral laser welding and
   spot welding.

24. The method of manufacturing a multi-core ferrule according to claim 1, wherein said step of fixing includes the step of deposition of metal by means of plating for fixing together the plurality of metal sheets each containing a plurality of apertures in a laminated state.

* * * * *

UNITED STATES PATENT AND TRADEMARK OFFICE
CERTIFICATE OF CORRECTION

PATENT NO. : 6,711,802 B2
APPLICATION NO. : 09/979398
DATED : March 30, 2004
INVENTOR(S) : Shinichi Okamoto It is certified that error appears in the above-identified patent and that said Letters Patent is hereby corrected as shown below:

Column 10:
line 7, after "each" insert --of the remaining sheets-- and delete "other said sheet";
line 9, after "said" insert --plurality of flat-surface metal--;
line 22, delete "some" and insert --same--;
line 37, delete "relatively thick one of the";
line 38, delete "sheets is" and insert --sheet--;
line 38, after "layer" insert --is thicker than a metal sheet used forwardly thereof.--

Signed and Sealed this

Third Day of June, 2008

JON W. DUDAS
*Director of the United States Patent and Trademark Office*